United States Patent
Fireaizen

(10) Patent No.: US 8,249,618 B2
(45) Date of Patent: Aug. 21, 2012

(54) SYSTEM AND METHOD FOR ENABLING DETERMINATION OF POSITION OF A RECEIVER

(75) Inventor: Moshe Fireaizen, Halamish (IL)

(73) Assignee: Elta Systems, Ltd., Ashdod (IL)

( * ) Notice: Subject to any disclaimer, the term of this patent is extended or adjusted under 35 U.S.C. 154(b) by 763 days.

(21) Appl. No.: 11/989,477

(22) PCT Filed: Jul. 25, 2006

(86) PCT No.: PCT/IL2006/000863
§ 371 (c)(1),
(2), (4) Date: Jun. 12, 2008

(87) PCT Pub. No.: WO2007/013071
PCT Pub. Date: Feb. 1, 2007

(65) Prior Publication Data
US 2009/0111483 A1    Apr. 30, 2009

(30) Foreign Application Priority Data
Jul. 25, 2005    (IL) .......................................... 169855

(51) Int. Cl.
*H04W 24/00* (2009.01)
*G01S 1/22* (2006.01)
(52) U.S. Cl. .................. 455/456.1; 455/456.5; 342/393
(58) Field of Classification Search ............... 455/456.1, 455/456.2, 456.3, 456.5, 456.6; 342/42, 342/385, 386, 393
See application file for complete search history.

(56) References Cited

U.S. PATENT DOCUMENTS

| | | | |
|---|---|---|---|
| 3,946,385 A * | 3/1976 | Ewen ............................ | 342/386 |
| 3,967,277 A | 6/1976 | Hastings et al. | |
| 3,981,015 A | 9/1976 | Phipps | |
| 4,087,816 A | 5/1978 | Barszczewski et al. | |
| 4,197,542 A | 4/1980 | Hofgen | |

(Continued)

FOREIGN PATENT DOCUMENTS

DE    28 43 253 A    4/1980

(Continued)

OTHER PUBLICATIONS

"VHF omni directional range" Wikipedia. http://en.wikipedia.org/wiki/VHF_omnidirectional_range, May 4, 2005.

(Continued)

*Primary Examiner* — Christopher M Brandt
(74) *Attorney, Agent, or Firm* — Oliff & Berridge, PLC

(57) ABSTRACT

There is provided a system and method for positioning a receiver, the system comprising an antenna array coupled to a common generating and switching unit. The generating and switching unit is configured to generate a periodic signal and to switch the signal between at least two antennas, constituting a positioning signal; such that an RF receiver receiving the positioning signal and having a phase difference estimator is capable to measure phase differences between portions of the positioning signal transmitted by the spaced-apart antennas, the phase differences indicating the orientation of the received relative to the positioning system.

28 Claims, 9 Drawing Sheets

U.S. PATENT DOCUMENTS

| | | | |
|---|---|---|---|
| 4,283,726 A | | 8/1981 | Spence et al. |
| 4,464,662 A | | 8/1984 | Tomasi |
| 4,975,710 A | | 12/1990 | Baghdady |
| 5,084,709 A | | 1/1992 | Baghdady |
| 5,099,245 A | * | 3/1992 | Sagey ............... 342/357.395 |
| 5,126,513 A | * | 6/1992 | Wang et al. ............... 345/173 |
| 5,883,598 A | | 3/1999 | Parl et al. |
| 6,270,433 B1 | | 8/2001 | Orenstein et al. |
| 6,489,923 B1 | | 12/2002 | Bevan et al. |
| 6,573,865 B1 | | 6/2003 | Baghdady |
| 6,700,536 B1 | * | 3/2004 | Wiegand ..................... 342/417 |
| 6,876,326 B2 | | 4/2005 | Martorana |
| 7,136,660 B2 | | 11/2006 | Farber et al. |
| 7,260,408 B2 | | 8/2007 | Friday et al. |
| 2002/0008656 A1 | | 1/2002 | Landt |
| 2002/0102995 A1 | | 8/2002 | Zelmanovich et al. |
| 2002/0113709 A1 | | 8/2002 | Helms |
| 2002/0145563 A1 | * | 10/2002 | Kane et al. ................... 342/442 |
| 2003/0162552 A1 | * | 8/2003 | Lehtinen ..................... 455/456 |
| 2004/0198387 A1 | * | 10/2004 | Tsuji et al. ................. 455/456.1 |
| 2004/0260506 A1 | | 12/2004 | Jones et al. |
| 2005/0062647 A1 | * | 3/2005 | Marks ........................... 342/428 |
| 2006/0183488 A1 | | 8/2006 | Billhartz |
| 2010/0001896 A1 | * | 1/2010 | Fiereizen ........................ 342/42 |

FOREIGN PATENT DOCUMENTS

| | | |
|---|---|---|
| WO | WO 86/00716 A1 | 1/1986 |
| WO | WO 01/94974 A2 | 12/2001 |

OTHER PUBLICATIONS

Frank Vizard; Scientific American.com: Safeguarding GPS, Apr. 14, 2003 https://www.sciam.com/print_version.cfm?articleID=00079DD3-DAA0-1E96-8EA5809EC5880000.

Co-pending U.S. Appl. No. 11/989,478, filed Apr. 20, 2009.

Dec. 28, 2010 Office Action issued in U.S. Appl. No. 11/989,478.

Jul. 20, 2011 Office Action issued in U.S. Appl. No. 11/989,478.

* cited by examiner

SYSTEM AND METHOD FOR ENABLING DETERMINATION OF POSITION OF A RECEIVER

FIELD OF THE INVENTION

This invention relates to transmitting/receiving systems and methods and more specifically, to positioning systems and methods.

BACKGROUND OF THE INVENTION

Various positioning and navigation systems and methods are known, in which a platform of an unknown location (e.g. airborne platform, naval platform or a ground vehicle) communicates with a positioning system and is provided with information about its position relative to the positioning system (referred to as radial). A VHF Omnidirectional Range (VOR) system is a line-of-sight radio navigation system in which a ground station broadcasts an aircraft a VHF radio signal encoded with the angle to it, indicating the direction the aircraft lies from the station. Many VOR systems have another navigation aid called Distance Measuring Equipment (DME) at the same location, for providing the aircraft with its slant distance from the station. By knowing both the distance and radial from the station, the aircraft's position can be determined ("VHF omnidirectional range", Wikipedia, http://en.wikipedia.org/wiki/VHF_omnidirectional_range).

The GPS (Global Positioning System) is another positioning and navigation system allowing a platform equipped with a GPS receiver (and one antenna) to be provided with information about its position relative to one or more GPS satellites orbiting the earth. As known, the precision of the GPS is typically in the range of 2-3 meters (before the year 2000 the precision of the signal available for non military users was even more limited). This imposes a drawback for devices and operations which require a better precision. Furthermore, the operation of the GPS satellite communication infrastructure is controlled by the US Government, which reserves the right to limit the signal strength or accuracy of the GPS system, or to shut it down completely. Additionally, the GPS signal can be blocked or jammed, e.g. by a transmitter radiating a relatively low power radiation in the vicinity of the GPS receiver. Additionally, the typical update rate of GPS data is in the range of 50-100 Hz. This rate is not sufficient for highly maneuvering platforms, such as missiles and certain airplanes.

U.S. Pat. No. 3,981,015 discloses a phase comparison radio navigation system in which a prime transmitting station and one or more secondary transmitting stations radiate phase-locked signals of the same frequency in a time-shared sequence. Phase locking at the secondary station or stations is effected by using a common phase comparator both for locking a phase memory oscillator to the receiving prime signals and for locking the secondary signals at the antenna with the phase memory oscillator.

U.S. Pat. No. 4,975,710 discloses methods, algorithms and apparatus for direction-of arrival (DOA) measurement/computation based on long-baseline, phase-difference, paired-antenna interferometry and on DOA-computing array processing algorithms. Specifically, methods and algorithms based on direct, cyclically unambiguous estimation of the cosine of the DOA are described for resolving the cyclic ambiguities in long-baseline, phase-difference paired-antenna interferometers, and for steeling the computations to the vicinities of the solutions in computation-intensive array processing algorithms, thereby reducing computation load and time.

U.S. Pat. No. 4,197,542 discloses an electronic navigation system ground station, which may be either an omni-range beacon (such as VOR) or a passive direction finder. A circular array of antenna elements has a feed arrangement which includes switched programming of at least one discrete set of phase shifters to effect successively changed phase-rotation fields for minimizing the adverse effects of multipath signals between the ground station and a remote station, aboard an aircraft for example.

U.S. Pat. Nos. 6,573,865 and 5,084,709 disclose multi-element antenna clusters or arrays for the reception and transmission of radio waves for direction-finding, navigation aid and emitter and/or receiver location purposes. In particular, they relate to arrangements of multiple antennas whereby the direction of propagation (arrival or departure) of a wavefront is determined from a combination of the amplitudes of phasor (or total individual antenna output) differences between pairs of antennas, said arrangements being along certain geometrical patterns, such as a circle, an ellipse, a polygon, an open straight line, etc., with at least one longest dimension measuring more than one wavelength of the incident or departing wave.

U.S. Pat. No. 3,967,277 discloses a radio navigation system which includes a first pair of fixed transmitting stations, a second pair of fixed transmitting stations and a mobile station. The mobile station includes a receiver having first means for deriving a first signal indicative of the difference in the distances between the mobile station and each of the first pair of fixed stations and second means for deriving a second signal indicative of the difference in the distances between the mobile station and each of the second pair of fixed stations. Summing means are provided for adding the first and second signals to obtain a third signal indicative of a first line of position on which the mobile station is located, and difference means are provided for subtracting one of the first and second signals from the other to obtain a fourth signal indicative of a second line of position on which the mobile station is located.

Therefore, there is a need in the art for a positioning system and method that allows a platform equipped with only one receiver and one antenna to be provided with highly accurate positioning information. There is a further need in the art for a positioning system and method which provides its operators with full control over the system. There is also a need in the art for a positioning system and method which cannot be easily jammed. There is a further need in the art for a positioning system providing update rate of more than 50-100 Hz. There is also a need in the art for a positioning system capable of operating in outer space.

SUMMARY OF THE INVENTION

According to an embodiment of the invention there is provided a system for positioning a receiver, the system comprising an antenna array of at least two spaced-apart antennas coupled to a common generating and switching unit, said generating and switching unit is configured to generate a periodic signal and to switch the signal between the at least two antennas, constituting a positioning signal; such that an RF receiver receiving the positioning signal and having a phase difference estimator is capable to measure phase differences between portions of said positioning signal transmitted by said spaced-apart antennas, said phase differences indicating position information of the receiver relative to the position of the spaced-apart antennas.

According to another embodiment of the invention, there is provided a system for positioning a receiver, the system comprising two spaced-apart antenna arrays coupled to at least one generating unit; each antenna array comprises at least two spaced-apart antennas coupled to a common switching unit; said common switching unit is coupled to said generating unit and is configured to switch the signal between said at least two antennas, constituting a positioning signal; such that an RF receiver receiving said positioning signals transmitted by both antenna arrays and having a phase difference estimator is able to measure phase differences between portions of each of said positioning signals, said phase differences indicating position information of the receiver relative to the position of the antenna arrays.

According to yet another embodiment of the invention there is provided a system for positioning a transponder, the system comprising an antenna array of at least two spaced-apart antennas coupled to a common generating and switching unit, said generating and switching unit is configured to generate a periodic signal and to switch the signal between said at least two antennas, constituting a positioning signal transmitted to the transponder and returned to the system; the system comprises a phase difference estimator coupled to said antenna array and operable to measure phase differences between portions of the returned positioning signal; the system further comprising a positioning utility coupled to said phase difference estimator and configured to determine the position of the transponder relative to the position of the spaced-apart antennas.

According to a further embodiment of the invention, there is provided a method for positioning a receiver, the method comprising:
- providing a periodic signal switched between at least two spaced apart antennas of known locations coupled to a common generating and switching unit;
- measuring phase differences between portions of said signal as received by said receiver; and
- determining position information indicative of the position of the receiver relative to the location of said at least two antennas.

BRIEF DESCRIPTION OF THE DRAWINGS

In order to understand the invention and to see how it may be carried out in practice, specific embodiments will now be described, by way of non-limiting example only, with reference to the accompanying drawings, in which.

DETAILED DESCRIPTION OF SPECIFIC EMBODIMENTS OF THE INVENTION

Figure 1:
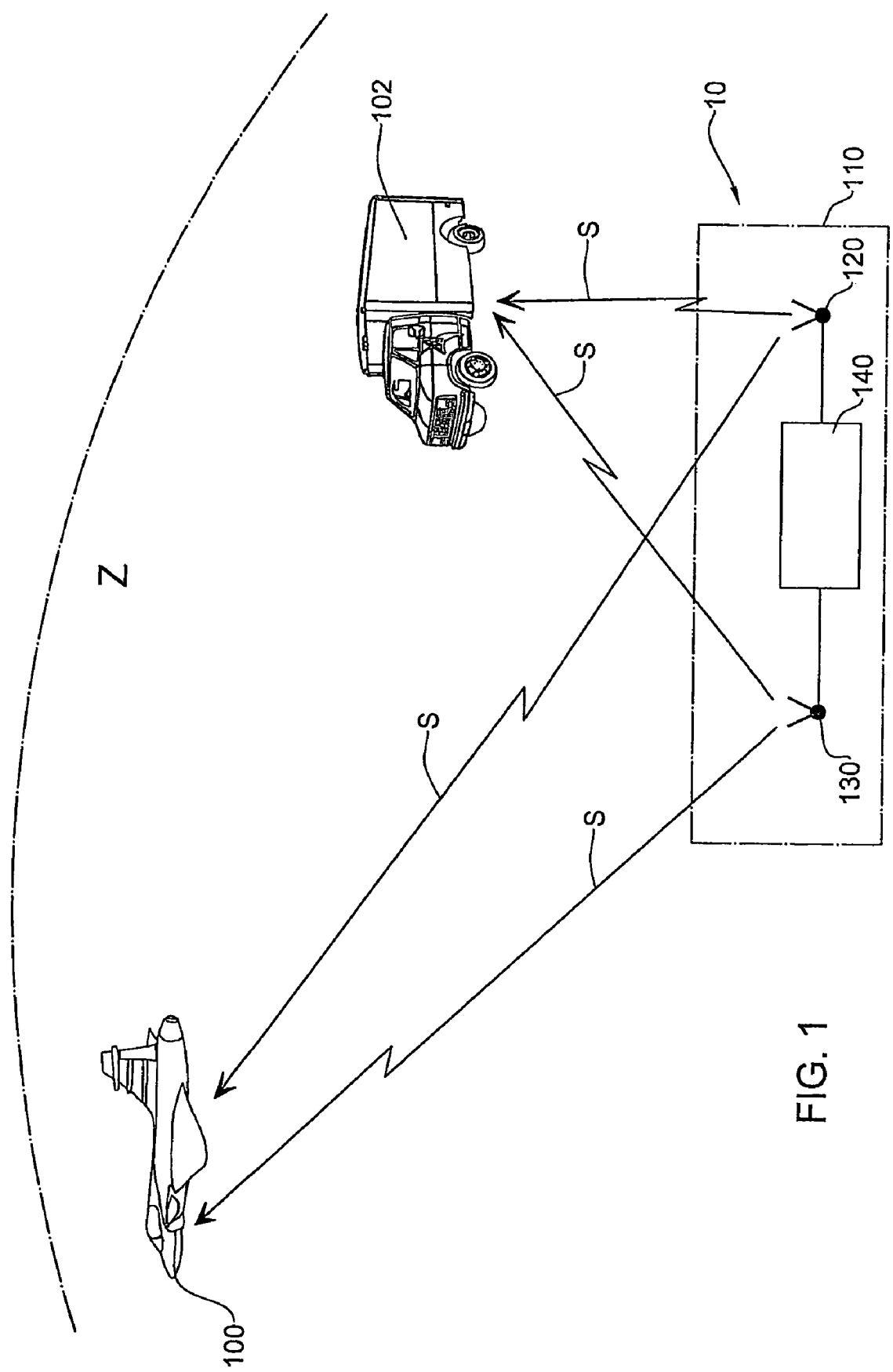
FIG. 1 is a schematic illustration of a simplified architecture of a positioning system according to an embodiment of the invention.

FIG. 1 is a schematic illustration of a simplified architecture of a positioning system 10 according to an embodiment of the invention. The positioning system 10 includes a base station 110 of a known position, having at least two spaced-apart RF antennas (two antennas 120 and 130 are shown in FIG. 1) and a generating and switching unit 140 commonly coupled to the antennas. Base station 110 radiates a positioning signal S, which can be received at a certain local zone Z. A Platform 100 of an unknown position (an airborne platform in this non-limiting example), equipped with an RF receiver and one antenna (not shown in FIG. 1), flying in zone Z, receives signal S and uses it for positioning. Also shown in FIG. 1 is another platform 102 (a ground vehicle) traveling within zone Z and receiving positioning signal from base station 110.

Positioning Signal S is a periodic signal (e.g. a 1 GHz sinusoidal signal) generated by unit 140 and switched between antenna 120 and antenna 130. In other words, signal S includes signal portions emitted by antenna 120 which alternates with signal portions emitted by antenna 130 (see discussion below referring to FIG. 6). Therefore, any platform within zone Z having an RF receiver equipped with a phase difference estimator for estimating the frequency and phase of the received signal (also known as a digital phase difference detector, see below with reference to FIG. 7) would be able to estimate the phase differences $\phi$ between portions of the positioning signal emitted by antennas 120 and 130. Phase differences detected at one point within zone Z (say, by platform 100) differ from those detected at another point (say, by platform 102), and correspond to the geometrical disposition of the receiver relative to antennas 120 and 130. As antennas 120 and 130 are located apart from each other (e.g. by 10 meters), any platform within zone Z receiving signal S, detecting phase differences $\phi$ and the frequency f of signal S, is provided with information sufficient for the determination of its position relative to the known position of antennas 120 and 130. The position of the station is e.g. known to any platform traveling within zone Z, or is transmitted to the platform via a dedicated transmission or embedded in the positioning signal S.

The concept of the present invention will now be explained in greater detail with reference to FIGS. 2-3 and 4a-4f, in which the same elements are marked by the same reference numbers. Reverting now also to FIG. 2, there is presented another illustration of the positioning system 10, showing the geometrical disposition of the positioning system operating in zone Z (zone Z is not shown in FIG. 2) and a platform 100 located within zone Z. Platform 100 is equipped with an RF receiver having a phase difference estimator allowing the estimation of the frequency f and phase differences $\phi$ that characterize portions of signal S (this will be detailed further below with reference to FIG. 7).

The portions of signal S, that are emitted by antenna 120, travel a slant distance $R_1$, which is longer by $\Delta R$ comparing those portions emitted by antenna 130, that travel a distance $R_2$.

By measuring f and $\phi$, $\Delta R$ could be determined using the following known relations (1) and (2):

$$2\pi N + \phi = 2\pi f \Delta t \tag{1}$$

$$\Delta R = c \Delta t \tag{2}$$

therefore, $$\Delta R = c(2\pi N + \phi)/2\pi f \tag{3}$$

wherein:

f is the frequency of signal S, as detected by a receiver at point 100;

φ is the phase difference between portions of the positioning signal transmitted by antennas 120 and 130, as detected at point 100 (see FIG. 3 and text below);

Δt is the time delay between portions of the positioning signal emitted by the spaced-apart antennas 120 and 130, as received at point 100 (note that for simplicity, a delay D that characterizes the operation of the phase difference estimator, and is a predefined and known parameter, is not included in relation (1));

N is an integer indicating the number of cycles of signal S along ΔR (see discussion below relating to the ambiguity of N, with reference to FIG. 7); and c is the speed of light.

As the distance $R_3$ between antennas 120 and 130 is known, and assuming that N is also known (solving of the ambiguity relating to N is discussed below with reference to FIG. 7), it is now possible to calculate spatial angle α, as follows:

$$\cos \alpha = \Delta R / R_3 \quad (4)$$

Thus, by measuring at an unknown point (e.g. point 100 shown in FIGS. 1 and 2) parameters f and φ which characterize a signal S transmitted from known points (points 120 and 130) in a switched manner as described above, a surface CS is defined, which is the surface of a cone generated by angle α, onto which points 100 and 120 are located. This provides information indicating the orientation of point 100 relative to points 120 and 130. The orientation of point 100 relative to points 120 and 130 could be determined using additional information, e.g. information gathered in a manner detailed below with reference to FIG. 3, or elimination procedures known per-se in the field of interferometry (including but not limited to the use of the assumed or measured height of point 100).

Figure 3:
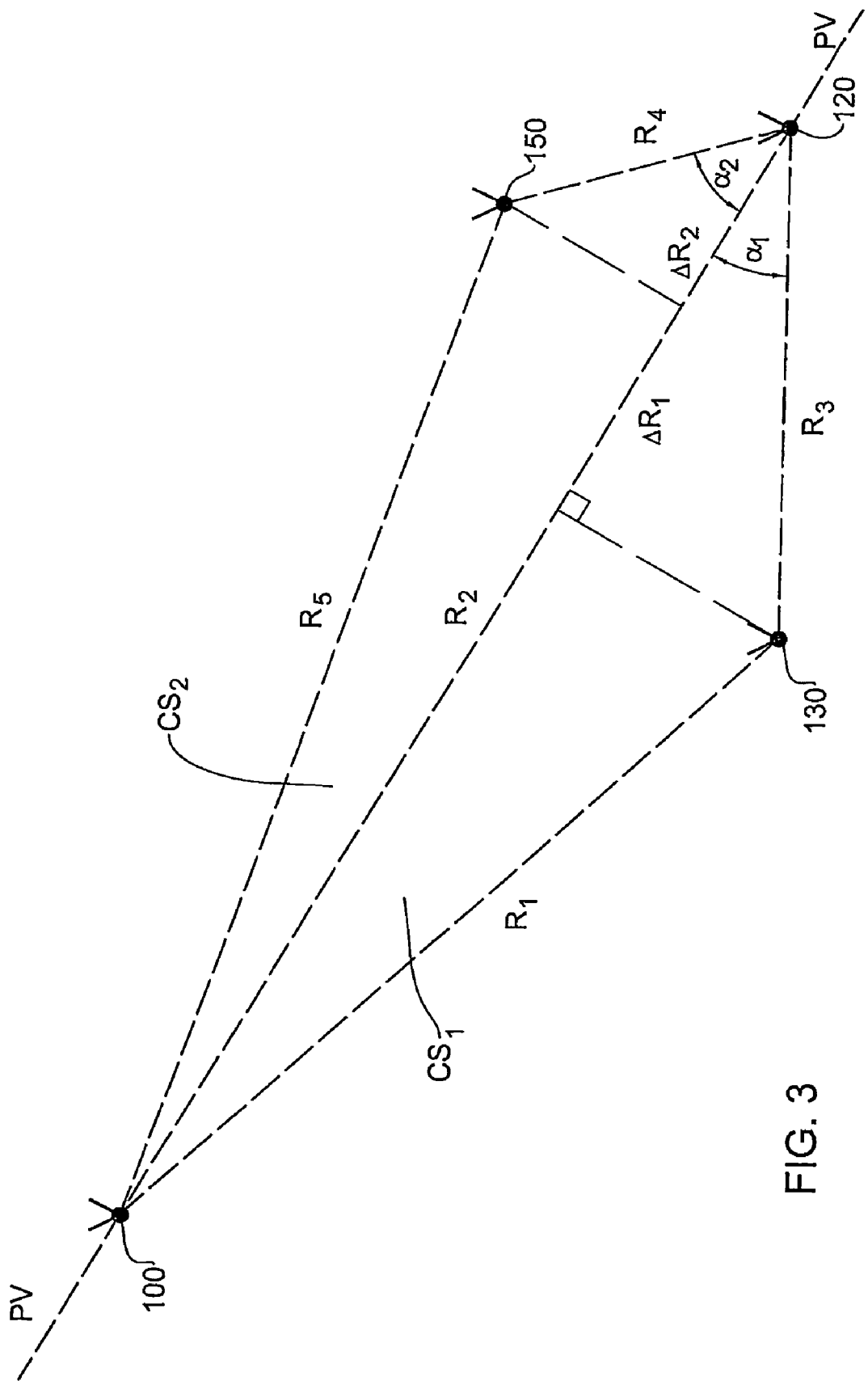
FIG. 3 is a simplified architecture of a positioning system according to another embodiment of the invention.

Turning now to FIG. 3, there is illustrated the geometric disposition of a point 100 relative to a positioning system according to another embodiment of the invention, in which a system 110 further includes a third antenna 150, located at a distance $R_1$ away from antenna 120. According to this embodiment, signal S is generated by a common unit 140 and switched between the three spaced-apart antennas 120, 130 and 150. In other words, the positioning signal S includes signal portions that are alternatively transmitted by antennas 120, 130 and 150. Signal S, as received at point 100, therefore allows the estimation of the phase difference between portions of the positioning signal transmitted by antennas 120 and 130, as well as the phase difference between portions of the positioning signal transmitted by antennas 120 and 150, as detected at point 100.

In a manner similar to the one described above with reference to FIGS. 1 and 2, two spatial angles, $\alpha_1$ and $\alpha_2$ are determined: $\alpha_1$ is determined with respect to antenna 120 and antennas 130 and 100; and $\alpha_2$ is determined with respect to antennas 120, 150 (the other antenna) and 100. Consequently, two Surfaces, $CS_1$ (representing the surface of a cone onto which points 100 and 120 are located) and $CS_2$ (representing the surface of a cone onto which points 100 and 120 are located) are defined. $CS_1$ and $CS_2$ intersect with each other, and the intersection line represents the pointing vector PV between antenna 120 and the unknown point 100. In other words, the orientation of the receiver relative to the positioning system could be determined.

Figure 4A:
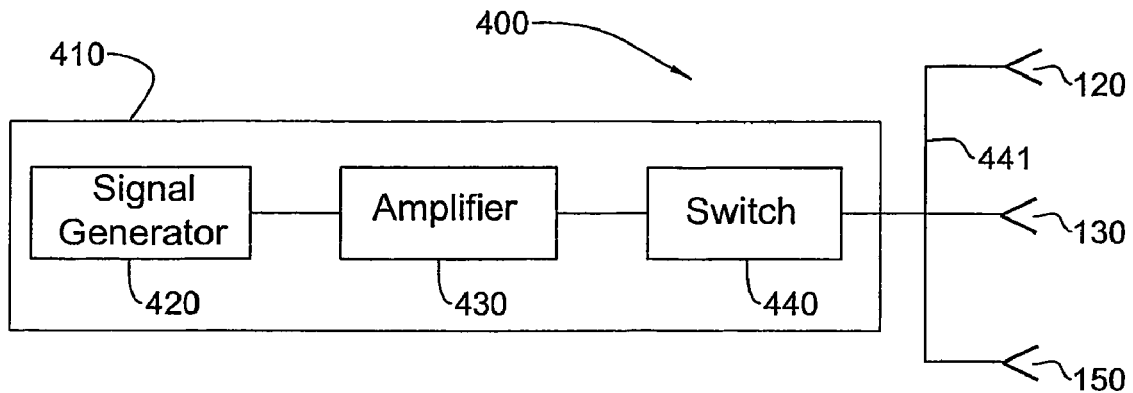
FIGS. 4a-4f schematically illustrate positioning systems according to several embodiments of the invention.

FIG. 4a schematically illustrates a positioning system 400 according to the embodiment of the invention illustrated in FIG. 3. The system 400 comprises a base station 410 which is coupled to an array of three spaced-apart antennas, (namely antennas 120, 130 and 150 shown in FIG. 3. Base station 410 comprises a signal generator 420 for generating a periodic signal (e.g. a sinusoidal signal). Also shown are an amplifier 430 and a switch 440 common to all antennas for switching the periodic signal between antennas 120, 130 and 150. The antennas are coupled to base station 410 via substantially identical feed lines 411 (note that non-identical feed lines could also be used, with appropriate means for compensation for consequent delays), such that the output of base station 410 feeds the antennas in a switched manner, thereby giving rise to a positioning signal which includes portions of signal transmitted alternatively from the antennas. As discussed above with reference to FIGS. 1-3, an RF receiver having a phase difference estimator and receiving the positioning signal (e.g. platform 100 in FIGS. 1-3) is able to determine the pointing vector to antenna 120.

If platform 100 is equipped with an altimeter (altitude meter), then its position could be defined in a manner known per-se using the determination of the pointing vector PV between the platform and antenna 120, in combination with the readings of the altimeter at point 100 (unless point 100 is at the same height as the antennas).

Figure 4B:
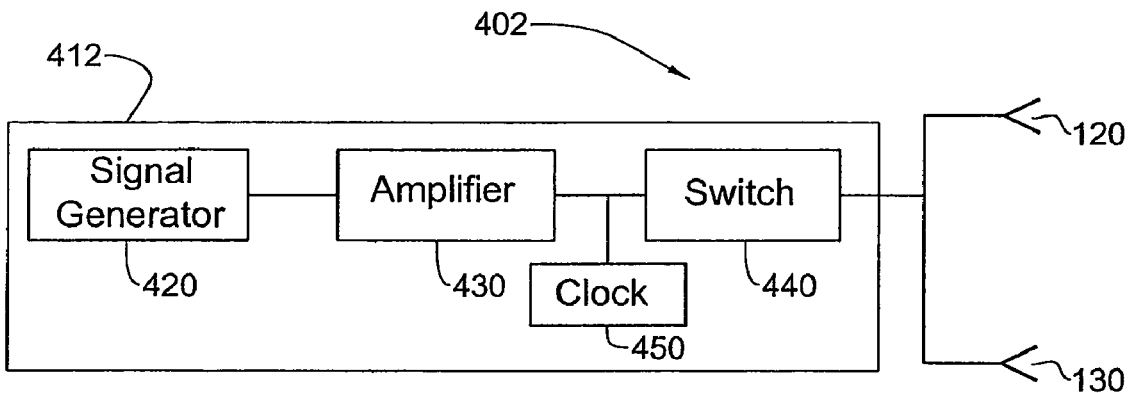

A positioning system 402, according to another embodiment of the invention, is shown in FIG. 4b. System 402 comprises an array of two antennas, 120 and 130. The base station 402 is further equipped with an accurate clock 450 (e.g. an atomic clock or a similar device). A platform receiving the positioning signal and having an atomic clock or a similar device in synchrony with clock 450 of the base station, is able to determine, in a manner known per-se, the distances between the platform (point 100 in FIG. 2) and antennas 120 and 130 (parameters $R_1$, $R_2$ shown in FIG. 3), and its position.

Figure 4C:
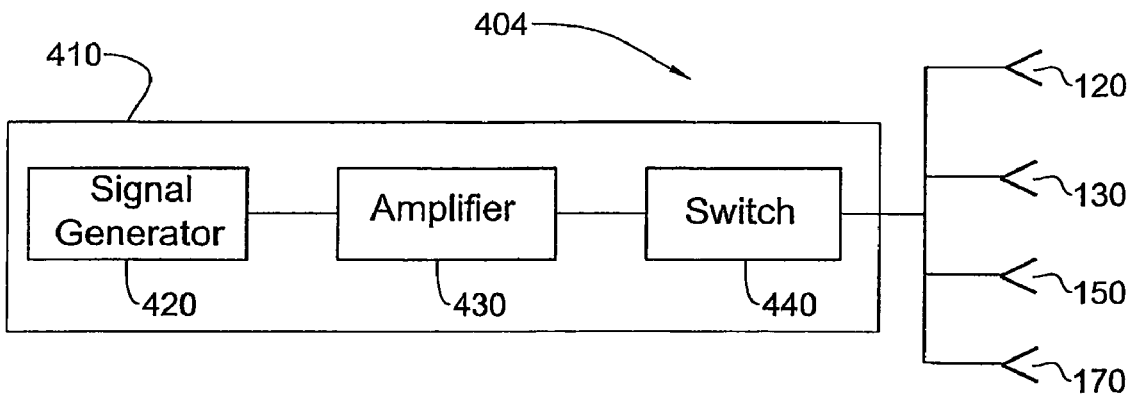
Figure 4D:
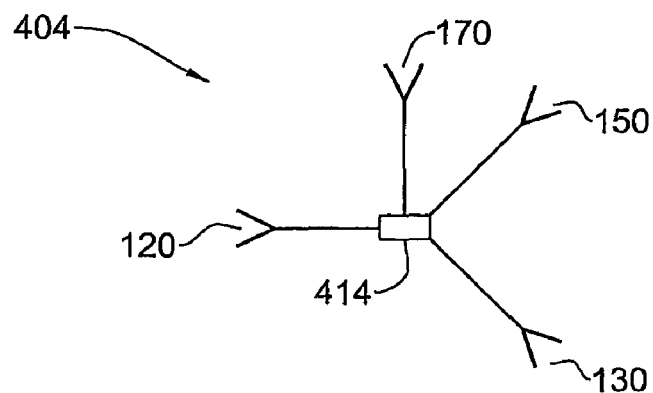

Another positioning system 404, according to yet another embodiment of the invention, is illustrated in FIGS. 4c and 4d: system 404 comprises an array of four antennas (120, 130, 150 and 170). The base station 414 is substantially identical to base station 410 shown in FIG. 4a. The antenna array is arranged in a tetrahedron form, in which antennas 120, 130 and 150 are located onto the same plane, and antenna 170 is located outside that plane. Note that the three-dimensional arrangement of the antenna array affects the directivity and shape of Zone Z (the zone in which the positioning signal can be received). In case full symmetry is substantially maintained, the resultant positioning system is substantially omnidirectional.

Figure 4E:
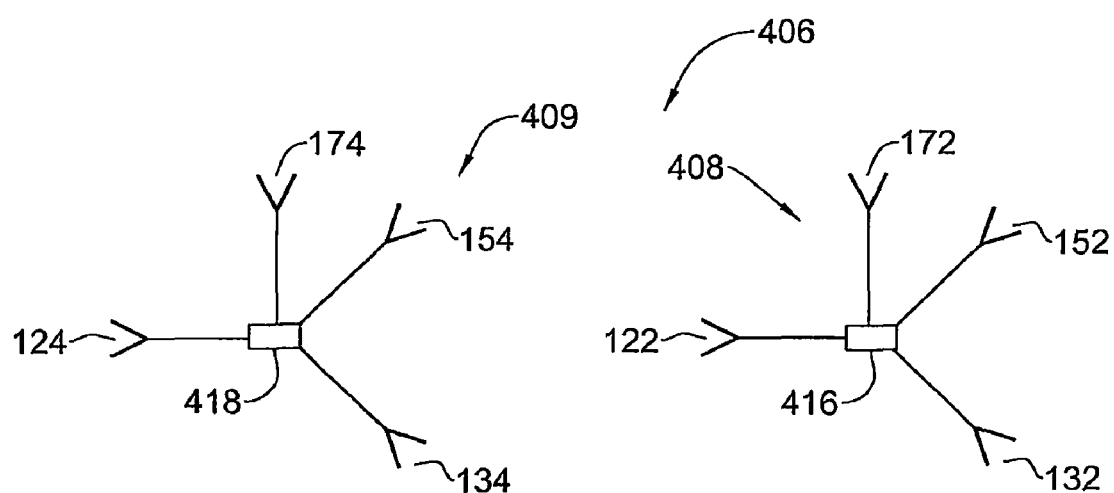

Another positioning system 406, according to yet another embodiment of the invention, is illustrated in FIG. 4e: in this embodiment, two positioning systems 408 and 409 operate in the same zone (this embodiment and additional embodiments, employing two adjacent positioning systems as will be detailed below, are hereinafter referred to as 'dual configuration' embodiments). Systems 408 and 409 can be any one of the types illustrated in FIGS. 4a-4d. In the non-limiting example of FIG. 4e, both systems are of the type illustrated in FIGS. 4c-4d, comprising an array of four antennas (122, 132, 152, 172 and 124, 134, 154 and 174, respectively) and base stations 416 and 418, respectively. As systems 408 and 409 operate substantially in the same zone, an RF receiver located at that zone will receive both signals. Therefore, the pointing vectors to the antennas of each system can be determined (as described above with reference to FIGS. 1-3). Both pointing vectors intersect at one point, at the position of the RF receiver. In other words, in the 'dual configuration' embodiment, the determination of the position of the receiver (also referred to as 'fix') can be realized, based on the positioning signal received from both positioning systems.

It should be noted that the position of the RF receiver could be determined based on positioning information obtained from a pair of positioning systems of the type described with reference to FIG. 2, also illustrated in FIG. 4f. This type of dual configuration system comprises two positioning systems, each having a base station (e.g. base station 410 shown in FIG. 4a) and an array of two antennas (e.g. antennas 120 and 130 illustrated in FIG. 2). As discussed above, with reference to FIG. 2, a positioning signal switched and emitted by an array of two antennas 120 and 130 and received at point 100, allows the determination of a surface plane of a cone, onto which are located points 100 and 120. Therefore, in this dual configuration, two cones are thus determined. These cones intersect at one or two lines, such that one intersection line indicates a vector, and the other one, if existing, can be eliminated in a manner known per-se (e.g. is below ground surface, is located at a very remote position, etc.)

It should further be noted that in the dual configuration, both positioning systems need not be identical in their structure. Therefore, one positioning system could be of the type shown in FIG. 4c, and the other of the types shown in FIGS. 4a-4b or discussed above, all as required.

Figure 4F:
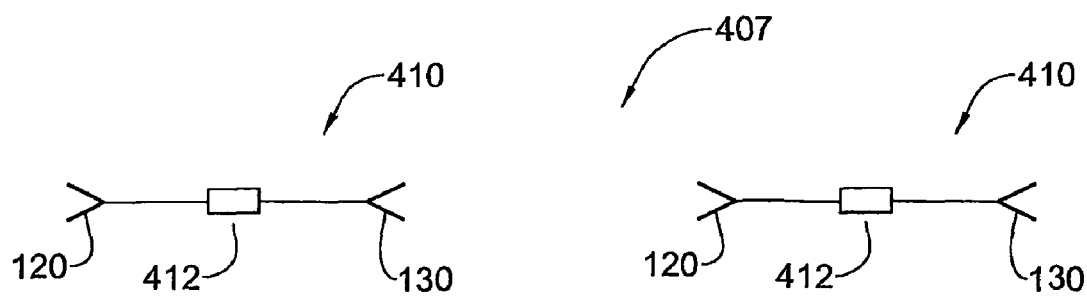

In FIGS. 4e and 4f, relating to the 'dual configuration', the base stations (e.g. elements 416 and 418 shown in FIG. 4e) were presented as a separate unit. It should be understood that the 'dual configuration' of the invention can be implemented with a single base station coupled to and operating dual arrays of antennas, such that each antenna array constitutes its own positioning signal.

Figure 2:
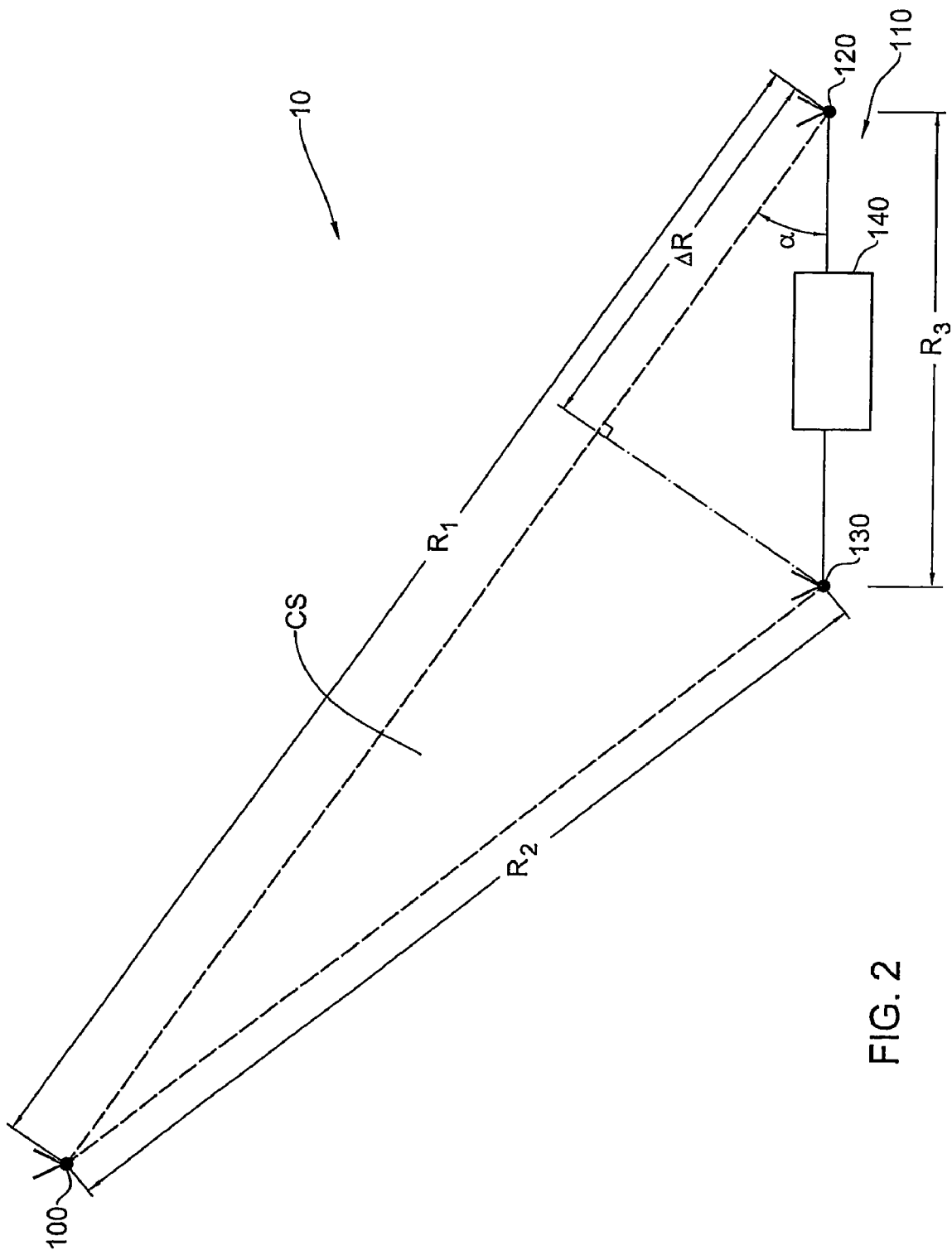
FIG. 2 is another illustration of the positioning system according to the embodiment of the invention shown in FIG. 1.

For simplicity, the foregoing description and specifically the discussion relating to FIG. 2, did not include explanation regarding the ambiguity relating to the determination of parameter N, indicating the integer number of cycles of signal S along ΔR. There are known several methods for solving the ambiguity of N and the invention is not limited to any one of them. According to an embodiment of the invention, the ambiguity of N is solved in the following manner, discussed with reference to FIG. 5 together with FIG. 2: in order to determine N, the positioning signal S includes signal portions having a first frequency $f_1$, and signal portions having a second frequency, $f_2$. The signal portions having the frequency $f_1$ are switched between and emitted by all the antennas at the antenna array (two antennas 120 and 130 in the example shown in FIG. 2), as well as those having the frequency $f_2$. Therefore, a receiver having a phase difference estimator located at point 100, will measure a first phase difference $\phi_1$ corresponding to the first frequency $f_1$, and a second phase difference $\phi_2$, corresponding to the second frequency $f_2$. The difference between the detected values of $\phi_1$ and $\phi_2$ is used for determining N, in the following manner:

Frequencies $f_1$ and $f_2$ are selected such that $N_1$ and $N_2$, indicating the integer number of cycles of signal S along ΔR, will follow the relation:

$N_1 = N_2 + k$, wherein $k$ is an integer having law values from a limited set of values (e.g. 1, 2, ... n) (5)

For example, if $f_1$=1 GHz and $f_2$=1.1 Ghz, then k would have a value from a predefined and limited set of values, e.g. k=1, 2 or 3. Note that k>0 if $f_1 < f_2$.

According to the known relation (1), ($2\pi N + \phi = 2\pi f \Delta t$) and by dividing:

$(2\pi N_1 + \phi_1)/2\pi N_2 + \phi_2 = 2\pi f_1 \Delta t / 2\pi f_2 \Delta t$ (6)

and following simple arithmetic procedures, $N_1(k)$ is determined as:

$N_1(k) = (f_1\phi_1 + f_2\phi_2)/2\pi(f_2-f_1) + f_1 k/(f_2-f_1)$ (7)

Using relation (7) with the measured values of $f_1$, $f_2$, $\phi_1$ and $\phi_2$ together with the predefined and limited set of values for k (e.g. k=1, 2 or 3), $N_1$ is determined as the optimal solution of relation (7) (e.g. when the minimum of a truncN$_1$ or (1-truncN$_1$) is achieved). In other words, in order to solve the ambiguity of N, the periodic signal includes two frequencies of a predefined difference (e.g. 1 MHz); the predefined difference gives rise to a limited set of values for k, and therefore the value of N could be easily determined by measuring parameters f and $\phi$ of signal portions of both frequencies (that is, parameters $f_1$, $f_2$, $\phi_1$ and $\phi_2$).

Figure 5:
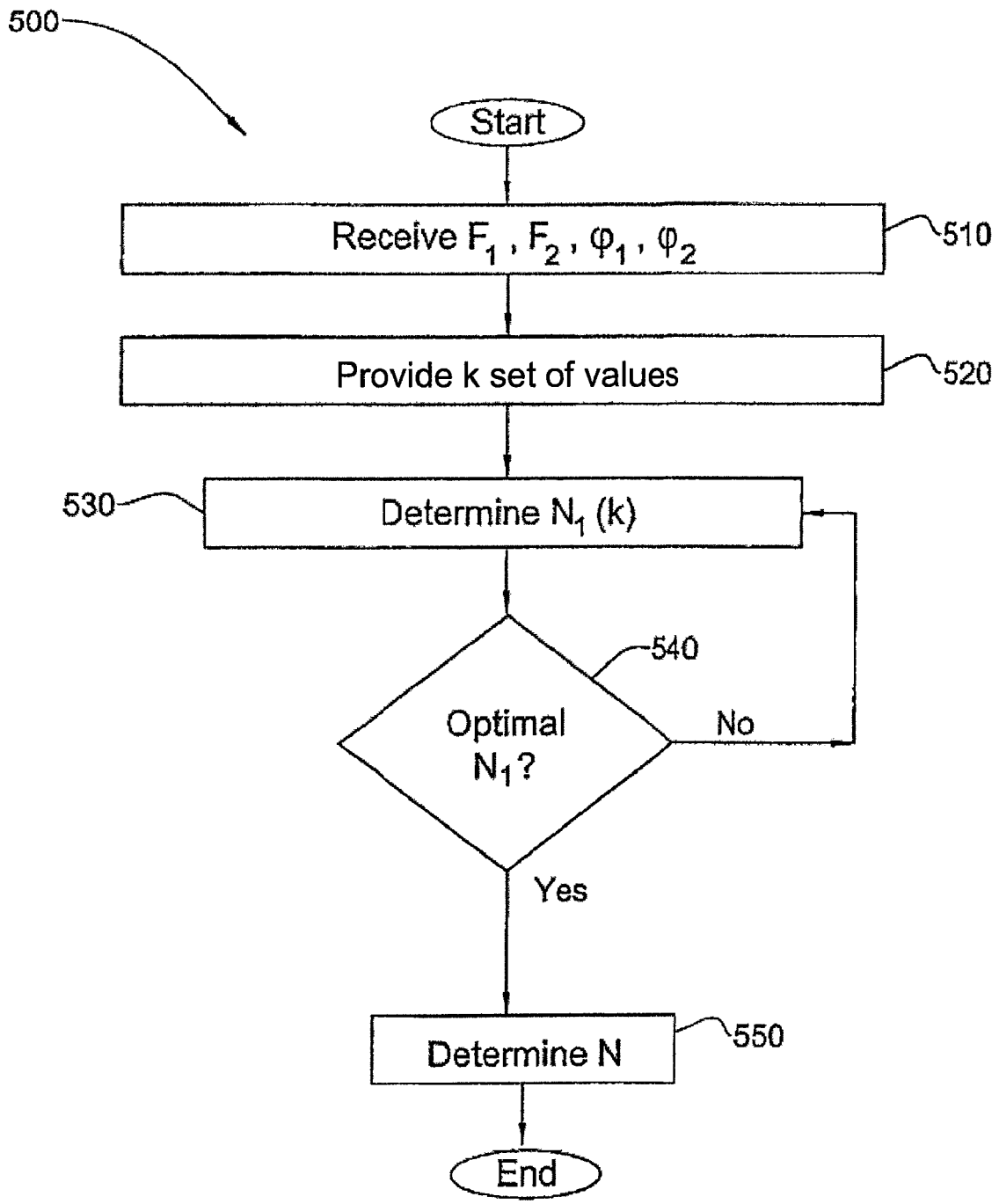
FIG. 5 is a flow chart showing a sequence of operations carried out by a receiver receiving a positioning signal transmitted by a positioning system according to one embodiment of the invention.

FIG. 5 is a flow chart showing a sequence of operations 500 carried out by the receiver (platform 100 shown in FIG. 1) for the determination of parameter N:

In operation 510: receive measured parameters $f_1$, $f_2$, $\phi_1$ and $\phi_2$;

In operation 520: provide a set of values for parameter k. for example, k could be provided from a reference table according to the difference between $f_1$ and $f_2$ (e.g., for a 100 MHz difference, the set of values for k includes the values 1, 2 and 3);

In operation 530: the set of values of $N_1(k)$ is determined, using relation (7) above for the various values of k provided at operation 520;

In operation 540, the optimal $N_1(k)$ is selected, and

In operation 550, the selected $N_1(k)$ is determined as parameter N.

Figure 6:
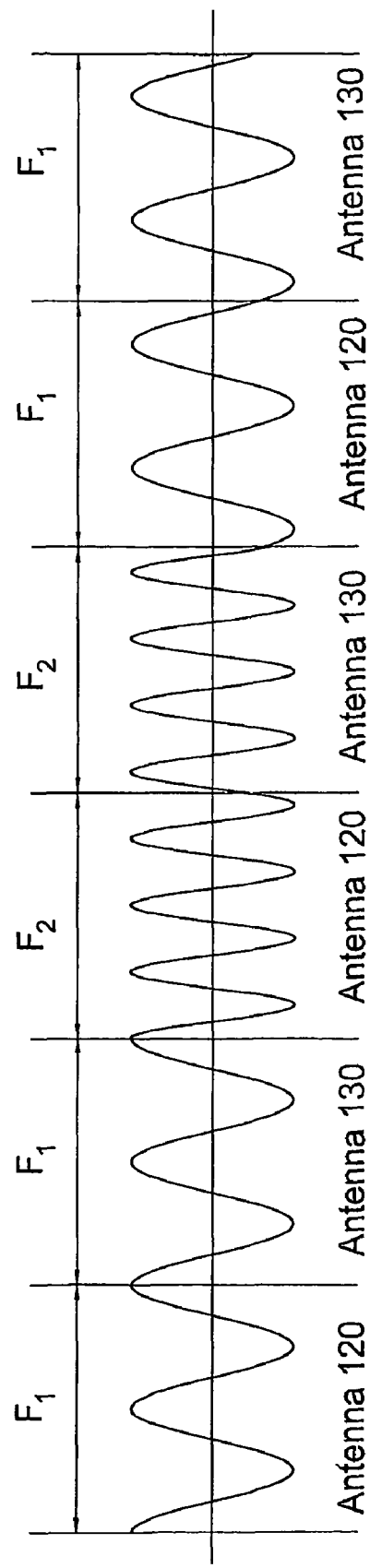
FIG. 6 illustrates a signal generated by a positioning system according to an embodiment of the invention.

Following the above description regarding the definition of parameter N, it should be noted that the positioning signal S, as discussed above with reference to FIGS. 1-3 and 4a-4e, includes signal portions having a first frequency $f_1$, and signal portions having a second frequency, $f_2$. The signal portions having the frequency $f_1$ are switched between and emitted by all the antennas at the antenna array, as well as those having the frequency $f_2$. A schematic illustration of a positioning signal S as generated for example, by the positioning system 402 shown in FIG. 4b, is illustrated in FIG. 6. It should be noted that the portions transmitted by one antenna need not be identical in length to those transmitted by the other antenna/s. The timing and duration of the switching of the signal between the transmitting antennas can be changed along the transmission of the positioning signal. Furthermore, there is no need to sequence $f_2$ portions after each $f_1$ portions of signal, and other combinations are possible. Furthermore, additional signal portions carrying additional information (e.g. the identity of the base station, and more) could be embedded in the positioning signal. The positioning signal needs to be transmitted in a continuous manner while being alternately switched between the antennas.

It should be understood that the phase difference between portions of positioning signal alternatively transmitted by the different antennas (according to the various architectures as described above), is affected by the geometrical arrangement of the antennas. Furthermore, the phase difference is detected by the receiver by comparing a portion of the positioning signal with a delayed portion of the same positioning signal.

It should be noted that the invention is not limited by the above-detailed solution for solving N ambiguity, that involves transmission of two, different frequencies. The invention can be implemented with other approaches, e.g. step-wise solutions as known in the field of interferometry.

Figure 7:
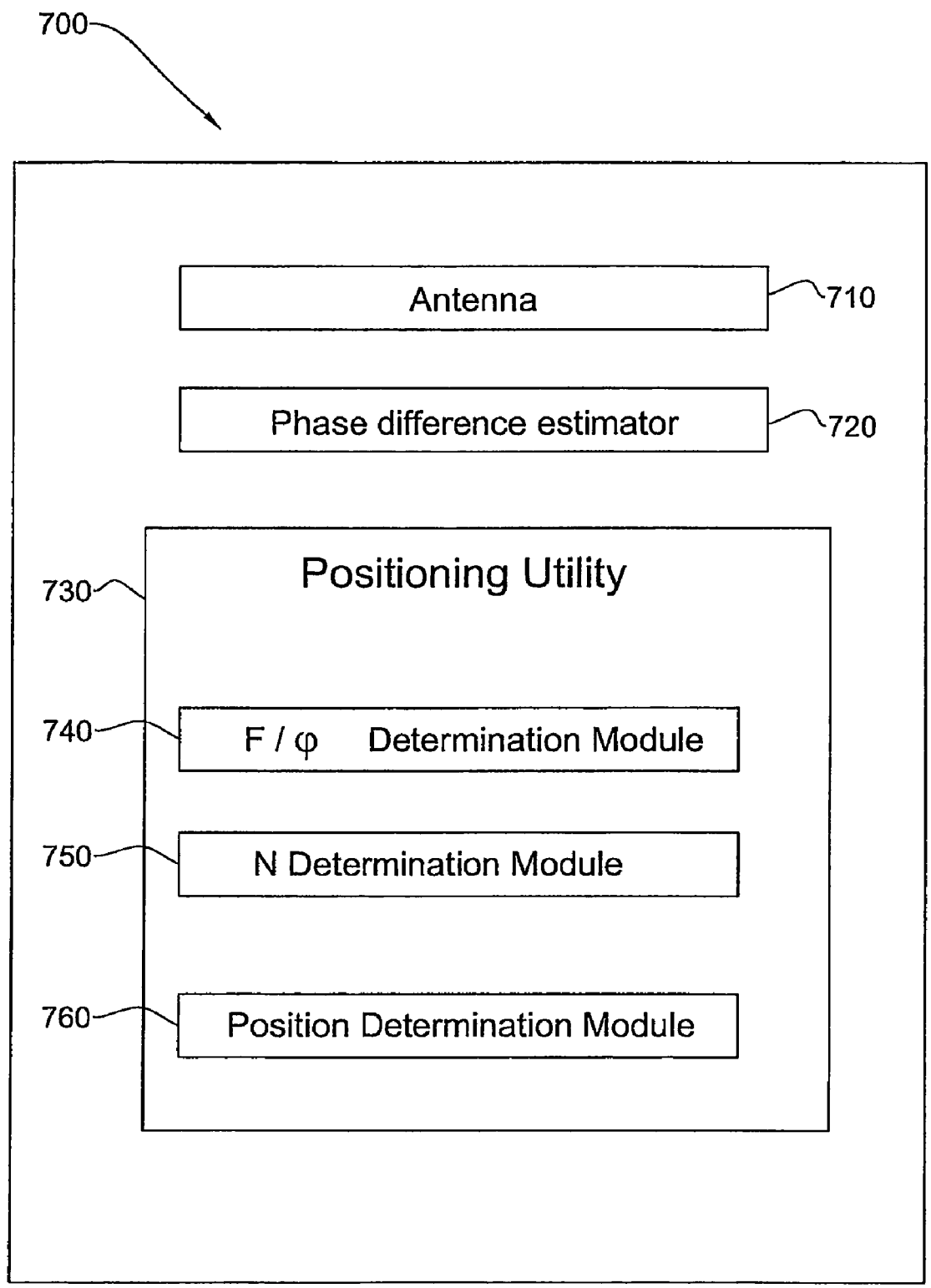
FIG. 7 is a schematic illustration of a receiver designed for receiving a positioning signal generated by a positioning signal according to an embodiment of the invention.

FIG. 7 is a schematic illustration of a receiver 700 designed for receiving a positioning signal generated and transmitted by a positioning system according to the invention as described above, and for determining its position accordingly. Receiver 700 can be mounted onboard a flying object, e.g. an aircraft, an Airborne Unmanned Vehicle (AUV), a missile, etc., or any other type of moving or stationary object. Receiver 700 is operable with one antenna only. Receiver 700 comprises, inter-alia, a single antenna 710, a phase difference estimator 720 and a positioning hardware/software utility 730. The phase difference estimator 720 can be realized based on any devices and methods known in the art for estimating phase differences. For example, phase difference estimator 720 may include a digital comparator for comparing a currently received portion of signal with a previously received portion of the same signal (a portion fed via a delay component, e.g. a FIFO (First In First Out) buffer providing a 0.5 μsec. delay). The phase difference estimator 720 can be realized based on a Modulation-on-Pulse device, known in the art. Positioning utility 730 comprises an f/φ determination module 740 for determining the frequency f and phase φ of various portions of the received signal, N determination module 750 for determination of parameter N (see discussion above with reference to FIG. 5), and position determination module 760 for calculating the position of the receiver. Not shown in FIG. 7 are Analog-to Digital converters, which may be required.

Receiver 700 is illustrated in FIG. 7 in a non-limiting manner as a stand-alone receiver. However, it should be understood that the receiver can be integrated with onboard hardware without departing from the scope of the invention. Furthermore, the receiver could comprise only a positioning utility (element 730), and be coupled to on-board antenna and phase difference estimator, also used for other purposes. The positioning utility 730 could be implemented as a software utility operable by an onboard computer for positioning purposes. The receiver could serve as a transponder and comprise only a transmit/receive module, and transpond the positioning signal to a remote control station, which analyzes the signal, determines the position of the receiver and, if required, transmits it navigation and/or guidance information.

Figure 8:
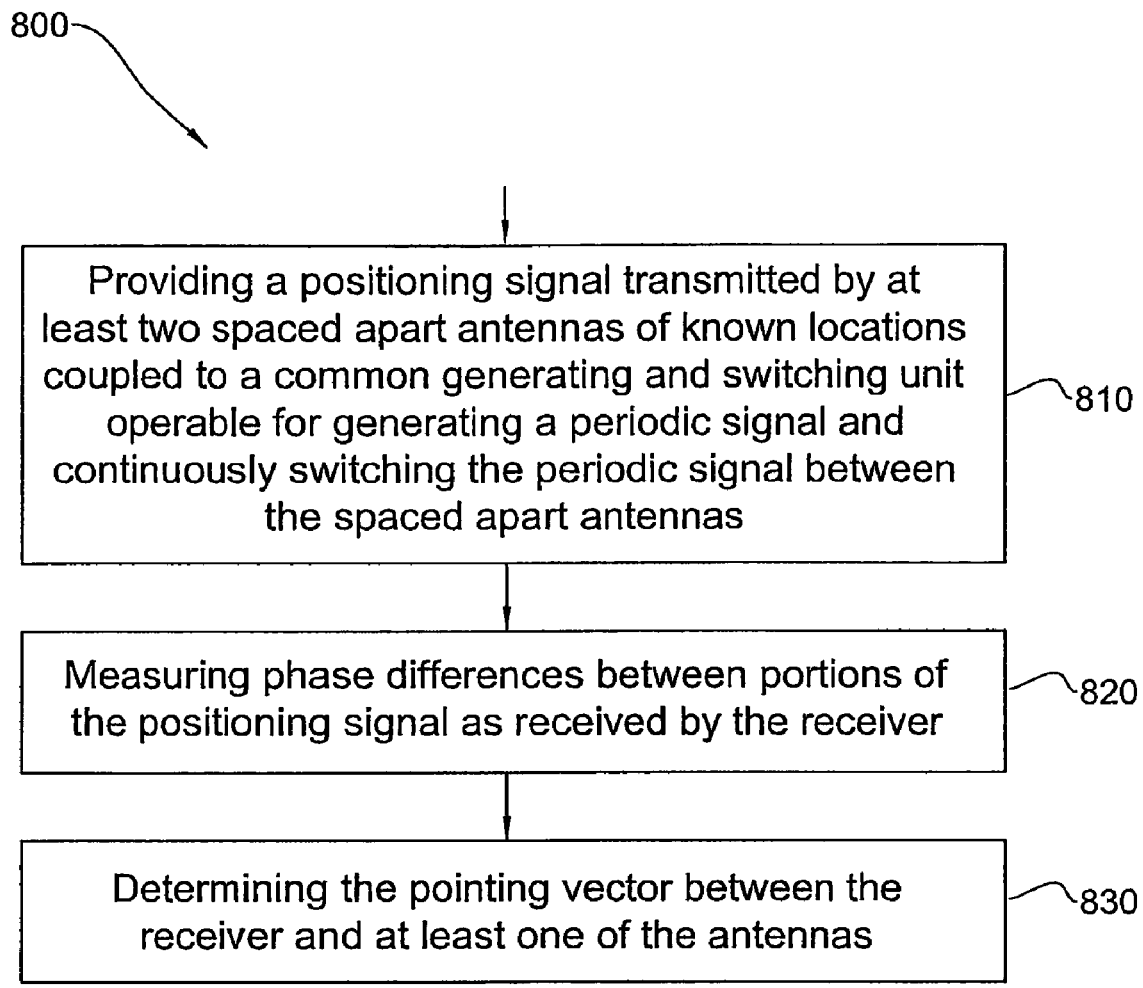
FIG. 8 is a flow chart showing a sequence of operations carried out by a positioning system according to an embodiment of the invention.

FIG. 8 illustrates a positioning method according to an embodiment of the invention, showing a sequence of operations 800 carried out for determining position information indicative of the position of a receiver of unknown position, receiving a positioning signal generated and transmitted by a positioning system according to the invention. The positioning method comprises the following operations:

In operation 810: providing a positioning signal transmitted by at least two spaced-apart antennas of known locations coupled to a common generating and switching unit operable for generating a periodic signal and switching the periodic signal between said at least two spaced-apart antennas;

In operation 820: measuring phase differences between portions of said positioning signal as received by said receiver; and In operation 830: determining the pointing vector between the receiver and at least one of said antennas, thereby allowing the determination of the position of the receiver relative to the location of said at least two antennas.

Following operations 810-830, the position of the receiver relative to the antennas could be determined, as described above.

The invention was described mainly with reference to an airborne platform. It should be noted that the invention is also applicable for ground and sea-borne vehicles, with the required alterations and modifications. The invention could also be realized as a hand-held mobile device.

The concept of the present invention can be implemented in a system that involves two-way communication of the base station with the platform of the unknown location, e.g. a guided UAV (Unmanned Airborne Vehicle), a mobile wireless communication device, etc. In such a scenario, the returned signal coming from the platform allows, in a manner known per-se, to determine the range between the platform and the base station. Utilizing the concept of the present invention, the direction of the platform relative to the base station can be determined, and in combination the positioning of the platform is established.

As the platform communicates with the base station, it is possible to have the platform operate as a transponder, returning to the base station the signal coming therefrom as received by the transponder. In such a case, it is also possible to conduct all position calculations at the base station (or at another station connected thereto), and e.g. provide the platform with flight instructions based on its calculated position.

The present invention could be integrated with a cellular communication network, e.g. for supporting geographically-based services. Typically, a cellular communication network is formed as a grid of cells covering a service area. In each cell there are provided network components (e.g. cell site or base station, including transmitting/receiving equipment) serving the mobile communication devices currently located within the cell and communicating with other network components e.g. other cell sites, central components, etc.). Each mobile communication device communicates in a timely manner with its cell site, receiving and returning a control signal thereby providing the network with information indicating the current range between the mobile device and the serving cell site. However, typically the specific position of the mobile device within a cell is unknown to the network. For example, as is clear in light of the detailed discussion above, by proving a cell site having two antennas and switching the control signal therebetween information about the direction of the mobile device relative to the cell site can be established.

The present invention could be integrated with other positioning systems (e.g. GPS system), in order to validate the readings of such other positioning systems. For example, the present invention could be used that way to indicate jamming or deception of the GPS signal, or to calibrate INS (Inertial Navigation System) drifts. By providing accurate positioning information, the present invention could also be used for correlating timed information between different and remote systems.

The positioning system according to the various configurations described above provides high precision position measurements. The precision is affected by the range of frequencies, and it is clear that at higher frequencies, better precision is yielded. However, in order to provide greater system range, lower frequencies are required. Note that while at the frequency range of about 1 GHz, Line Of Sight (LOS) transmission is required; this limitation is decreased at lower frequencies. The precision is further affected by the geometry of the array of the antennas which are coupled to a common switch, and in the 'dual configuration' of the invention, also by the geometry of the two antenna arrays. Additional precision is achieved by averaging phase measurements over a period of time (e.g. over 1 msec.). System errors are minimal as there is no need to compensate for receiver errors and to correlate readings from different receivers.

The positioning system according to the various configurations described above provides high update rate. The update rate is affected by the width of the periodic signal as well as by the length of the switching cycle (i.e. the length of time needed for transmission of the periodic signal by all antennas in the antenna array). For example, by setting the width of a 1 GHz periodic signal to 1 msec, and the length of the switching cycle to 4 msec, a 100 KHz update rate is maintained. Note that high update rate provides better navigation precision and better signal-to-noise ratio, and consequently, larger coverage area.

The positioning system, according to the present invention, is better protected against blocking and jamming. The positioning signal available to receivers located within the coverage area of the positioning system is stronger than the GPS signal available in most areas covered by the GPS system, and therefore a stronger signal is required for blocking and jamming.

The invention was described with reference to RP radiation, and mainly to RF radiation of frequencies of about 1 Ghz. It should be noted that the invention is not limited by the exemplified frequencies, and could be employed along other portions of the radio spectrum as well as other electromagnetic radiation spectra. Furthermore, the invention is not limited to electromagnetic radiation and is applicable to any other form of propagating wave-borne energy, such as acoustic, ultrasonic, etc.

For simplicity, the positioning systems, according to various embodiments of the invention, were described as stand-alone systems. It should be noted that a positioning system according to the invention could be integrated with other systems e.g. other positioning systems, direction-finders, radar systems and many more, with the required alterations and modifications.

The invention claimed is:

1. A system operable to enable determination of a position of a receiver, comprising:
    an RF receiver configured to receive a periodic signal; and
    a phase difference estimator,
    wherein the periodic signal is received by the receiver from an antenna array of at least two spaced-apart antennas,
    the periodic signal has parts separated by a time delay and having a same frequency,
    different parts of the periodic signal are transmitted by different antennas of the at least two spaced-apart antennas,
    the RF receiver is associated with the phase difference estimator,
    the phase difference estimator is configured to measure phase differences between the parts of the signal, the phase differences being indicative of at least a surface, and
    the position of the receiver is on the at least the surface, wherein the at least the surface is a cone, and the receiver is located on the cone.

2. The system of claim 1, further comprising the antenna array of the at least two spaced-apart antennas,
    wherein the antenna array is coupled to a common generating and switching unit, the common generating and switching unit being configured to generate the periodic signal and to switch the periodic signal between the at least two spaced-apart antennas of the antenna array to thereby generate the different parts of the signal.

3. The system of claim 1, wherein a pointing vector between the receiver and the antenna array is on the at least the surface.

4. The system according to claim 2, wherein the common generating and switching unit is configured to generate the periodic signal including signal parts of at least a first frequency and a second frequency, and to switch the periodic signal between the at least two spaced-apart antennas such that signal parts of the first frequency are switched between the at least two spaced-apart antennas and are followed by signal parts of the second frequency, which are switched between the at least two spaced-apart antennas.

5. The system according to claim 4, wherein the first frequency is in a range of about 1 GHz or more and the second frequency differs from the first frequency by about 1 MHz.

6. The system according to claim 2, wherein the at least two spaced-apart antennas are coupled to the common generating and switching unit via substantially identical feed lines.

7. The system according to claim 1, wherein the receiver is a transponder, the transponder is configured to receive the periodic signal and return the signal to a base station, the base station being configured for determining the position of the receiver.

8. The system according to claim 2, wherein the antenna array includes at least three antennas thereby enabling determining a pointing vector between the receiver and the antenna array.

9. The system according to claim 8, further comprising an altimeter and being configured for determining a position of the receiver.

10. The system according to claim 8, wherein the common switching and generating unit is coupled to a first accurate clock and the receiver is associated with a second accurate clock, the second accurate clock being synchronized with the first accurate clock, and the system is configured for determining a position of the receiver.

11. The system according to claim 1, wherein the antenna array comprises four antennas spaced apart in a tetrahedron form.

12. The system according to claim 1 being integrated with a cellular communication network, the cellular communication network comprising at least one cell site and at least one cellular device, wherein
    the antenna array of at least two spaced-apart antennas is integrated with the at least one cell site,
    the receiver is integrated with a cell device, and
    the system is configured for enabling positioning of the cellular device in the cellular communication network.

13. The system according to claim 4, wherein the phase difference estimator is configured to measure a first phase difference between signal parts of the first frequency and a second phase difference between signal parts of the second frequency.

14. A system operable to enable determination of a position of a receiver, comprising:
    an RF receiver configured to receive a first positioning signal and a second positioning signal; and
    a phase difference estimator,
    wherein the first positioning signal and the second positioning signal are received from first and second spaced-apart antenna arrays, respectively, each of the antenna arrays comprising at least two spaced-apart antennas,
    the RF receiver is associated with the phase difference estimator,
    the phase difference estimator is configured to measure phase differences between different parts of a same positioning signal, the different parts being separated by a time delay and having a same frequency,
    the different parts are transmitted by different antennas,
    the phase differences are configured to define at least a first surface of a first cone between the first antenna array and the receiver and at least a second surface of a second cone between the second antenna array and the receiver, and
    an intersection between the first surface and the second surface determines a line on which the receiver is located.

15. The system of claim 14 further comprising:
    the first and second spaced-apart antenna arrays coupled to at least one generating unit, wherein each antenna array comprises at least two spaced-apart antennas coupled to a common switching unit, the common switching unit is coupled to the generating unit to form a combination unit, the combination unit of the generating and common switching unit is configured to generate a periodic signal and to switch the periodic signal between at least two antennas of each of the first and second spaced-apart antenna arrays to generate the first positioning signal by the first antenna array and the second positioning signal by the second antenna array.

16. The system according to claim 15, wherein the combination of the generating and the common switching unit is configured to generate the first positioning signal and the second positioning signal, each positioning signal including signal parts of at least a first frequency and a second frequency, and to switch the first positioning signal and the second positioning signal between the at least two spaced-apart antennas in each antenna array, such that signal parts of the first frequency are switched between the at least two spaced-apart antennas and are followed by signal parts of the second frequency, which are switched between the at least two spaced-apart antennas.

17. The system according to claim 14, wherein at least one of the first and second spaced-apart antenna arrays comprises at least three antennas, thereby enabling determining a position of the receiver.

18. The system according to claim 14 being integrated with a cellular communication network, the cellular communication network comprising at least one cell site and at least one cellular device, wherein the antenna array of at least two spaced-apart antennas is integrated with the at least one cell site, the receiver is integrated with a cell device, and the system is configured for enabling positioning of said cellular device in the cellular communication network.

19. The system according to claim 16, wherein, for each of the first and second positioning signals, the phase difference estimator is configured to measure a first phase difference between signal parts of the first frequency and a second phase difference between signal parts of the second frequency.

20. A method of enabling determination of a position of a receiver, comprising:

receiving a periodic signal switched between at least two spaced-apart antennas of known locations coupled to a common generating and switching unit;

measuring phase differences between parts of the periodic signal received by the receiver, the parts being separated by a time delay and having a same frequency, each of the parts being transmitted by a different antenna of the at least two spaced apart antennas; and determining at least a surface based on phase differences, the receiver being located on the at least the surface, wherein the surface is a cone, and the receiver is located on the cone.

21. The method according to claim 20, wherein the periodic signal includes signal parts of at least a first frequency and a second frequency, and signal parts having the at least first frequency are switched between the at least two spaced-apart antennas and are followed by signal parts of the second frequency which are switched between said at least two spaced-apart antennas, and the method further comprises measuring a first phase difference between signal parts of the first frequency and a second phase difference between signal parts of the second frequency.

22. The method according to claim 20, wherein the receiver is a transponder, the transponder is configured to receive the periodic signal and to return a signal to a base station, and the base station is configured to determine the position of the receiver.

23. The method according to claim 20, wherein the antenna array includes at least three antennas, and the method further comprises enabling determining a pointing vector between the receiver and the antenna array.

24. The method according to claim 23, further comprising using an altimeter and determining a position of the receiver.

25. The method according to claim 20 wherein the antenna array comprises four antennas spaced apart in a tetrahedron form.

26. A method of enabling determination of a position of a receiver, comprising:

receiving a first periodic signal and a second periodic signal, the first periodic signal being switched between at least two spaced-apart antennas of a first antenna array and the second periodic signal being switched between at least two spaced apart-apart antennas of a second antenna array, wherein the spaced-apart antennas of the first and second antenna arrays are of known locations and are coupled to a common generating and switching unit;

measuring, for each of said first and second signals, phase differences between parts of the respective signal as received by the receiver, the parts being separated by a time delay and having a same frequency, each of the parts being transmitted by a different antenna of the at least two spaced apart antennas;

determining information indicative of a first surface of a first cone between the first antenna array and the receiver;

determining information indicative of a second surface of a second cone between the second antenna array and the receiver; and determining an intersection between the first surface of a cone and the second surface of a cone, the intersection determining a line on which the receiver is located.

27. The method of claim 26, wherein at least one of the first and second antenna arrays comprises at least three antennas, thereby enabling determining a position of the receiver.

28. The method according to claim 26, wherein each of the first and second periodic signals includes signal parts of at least a first frequency and a second frequency, signal parts, of the first periodic signal, having the at least first frequency are switched between the at least two spaced-apart antennas, of the first antenna array, and are followed by signal parts of the second frequency which are switched between the at least two spaced-apart antennas of the first antenna array, signal parts, of the second periodic signal, having the at least second frequency are switched between the at least two spaced-apart antennas, of the second antenna array, and are followed by signal parts of the second frequency which are switched between the at least two spaced-apart antennas of the second antenna array, and the method further comprises, for each period signal, measuring a first phase difference between signal parts of the first frequency and a second phase difference between signal parts of the second frequency.

* * * * *